United States Patent [19]

Herke

[11] Patent Number: 5,904,867
[45] Date of Patent: May 18, 1999

[54] TOOL POSITION CONTROL

[75] Inventor: Donald Paul Herke, Shoreview, Minn.

[73] Assignee: Batesville Services, Inc., Batesville, Ind.

[21] Appl. No.: 08/944,369

[22] Filed: Oct. 6, 1997

[51] Int. Cl.⁶ .......................... B23Q 15/22; B23Q 17/22; B23K 26/00
[52] U.S. Cl. ................................ 219/121.6; 219/121.83; 266/76
[58] Field of Search ................... 364/474.03; 219/121.6, 219/121.67, 121.68, 121.69, 121.72, 121.83; 318/578; 266/60, 63, 76

[56] References Cited

U.S. PATENT DOCUMENTS

| | | |
|---|---|---|
| 2,238,601 | 4/1941 | Reynolds . |
| 2,717,979 | 9/1955 | Gardiner ................................. 318/578 |
| 3,062,996 | 11/1962 | Ertell et al. ............................. 318/578 |
| 3,636,251 | 1/1972 | Daly et al. . |
| 3,657,510 | 4/1972 | Rothrock . |
| 3,789,732 | 2/1974 | Levine . |
| 3,830,136 | 8/1974 | Sprenger . |
| 4,083,390 | 4/1978 | Ingham . |
| 4,333,636 | 6/1982 | Wajtkowicz .............................. 266/76 |
| 4,354,196 | 10/1982 | Neumann et al. . |
| 4,467,172 | 8/1984 | Ehrenwald et al. . |
| 4,564,739 | 1/1986 | Mattelin . |
| 4,710,330 | 12/1987 | Lewandowski et al. . |
| 4,727,235 | 2/1988 | Stamer et al. . |
| 4,773,946 | 9/1988 | Griebeler ................................. 266/76 |
| 4,794,222 | 12/1988 | Funayama et al. . |
| 4,803,336 | 2/1989 | Myer . |
| 4,822,987 | 4/1989 | Goldenfield et al. . |
| 4,874,919 | 10/1989 | Bransden et al. . |
| 4,948,940 | 8/1990 | Ruckl . |
| 4,970,600 | 11/1990 | Garnier et al. . |
| 4,985,780 | 1/1991 | Garnier et al. ..................... 219/121.68 |
| 5,067,086 | 11/1991 | Yamazaki et al. ................. 219/121.83 |
| 5,206,496 | 4/1993 | Clement et al. . |
| 5,262,613 | 11/1993 | Norris et al. . |
| 5,396,160 | 3/1995 | Chen . |
| 5,454,306 | 10/1995 | Fraser et al. . |
| 5,477,023 | 12/1995 | Schneider et al. . |
| 5,515,290 | 5/1996 | Honda . |
| 5,538,056 | 7/1996 | Thoma . |
| 5,584,016 | 12/1996 | Varghese et al. . |
| 5,685,999 | 11/1997 | Wiedemann et al. .............. 219/121.83 |

FOREIGN PATENT DOCUMENTS

| | | |
|---|---|---|
| 0080651 | 6/1983 | European Pat. Off. . |
| 0154279 | 9/1985 | European Pat. Off. . |
| 2670922 | 6/1992 | France . |
| 147825 | 4/1981 | German Dem. Rep. ................ 266/60 |

Primary Examiner—Geoffrey S. Evans
Attorney, Agent, or Firm—Wood, Herron & Evans, L.L.P.

[57] ABSTRACT

An apparatus with a tool position control has a base located adjacent the workpiece. A tool support is mounted with respect to the base and is movable linearly in a first direction with respect to a curved surface of the workpiece. A tool is mounted on the tool support a desired distance from the curved surface and is movable linearly in a second direction with respect to the curved surface. A tool position control mounted on the tool support includes a sensor disposed at a predetermined position with respect to the curved surface. The sensor moves in the second direction as a function of changes in the curvature of the curved surface in response to the tool support and the tool position control being moved in the first direction. The sensor is mechanically coupled to the tool, so that as the sensor moves through a displacement in the second direction in response to the tool support moving the sensor in the first direction, the tool is moved through an approximately equal displacement in the second direction, thereby causing the tool to follow the motion of the sensor in the second direction and maintain the tool the desired distance from the curved surface of the workpiece.

20 Claims, 3 Drawing Sheets

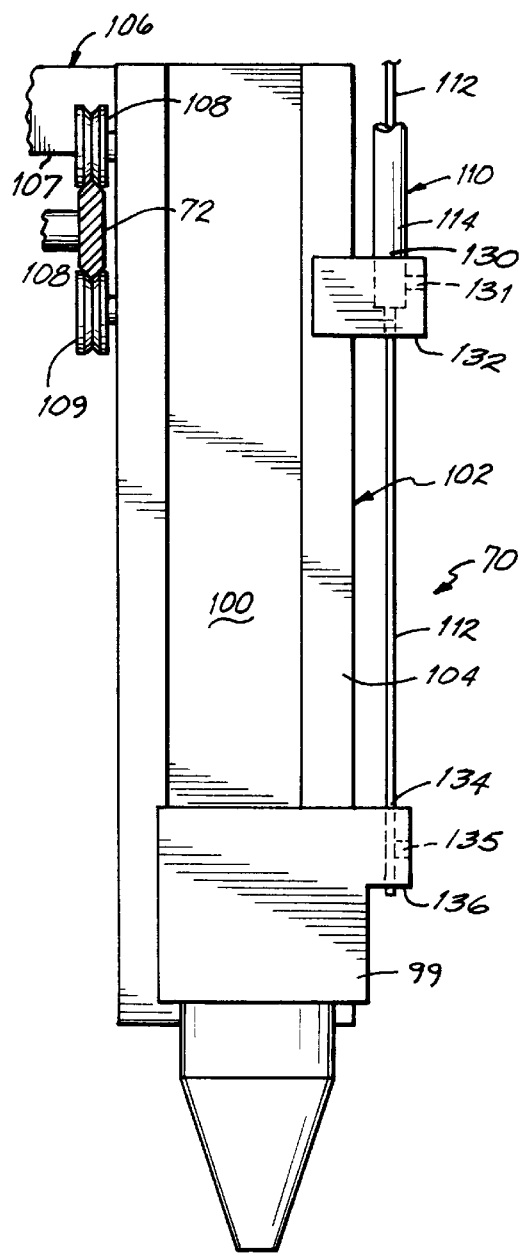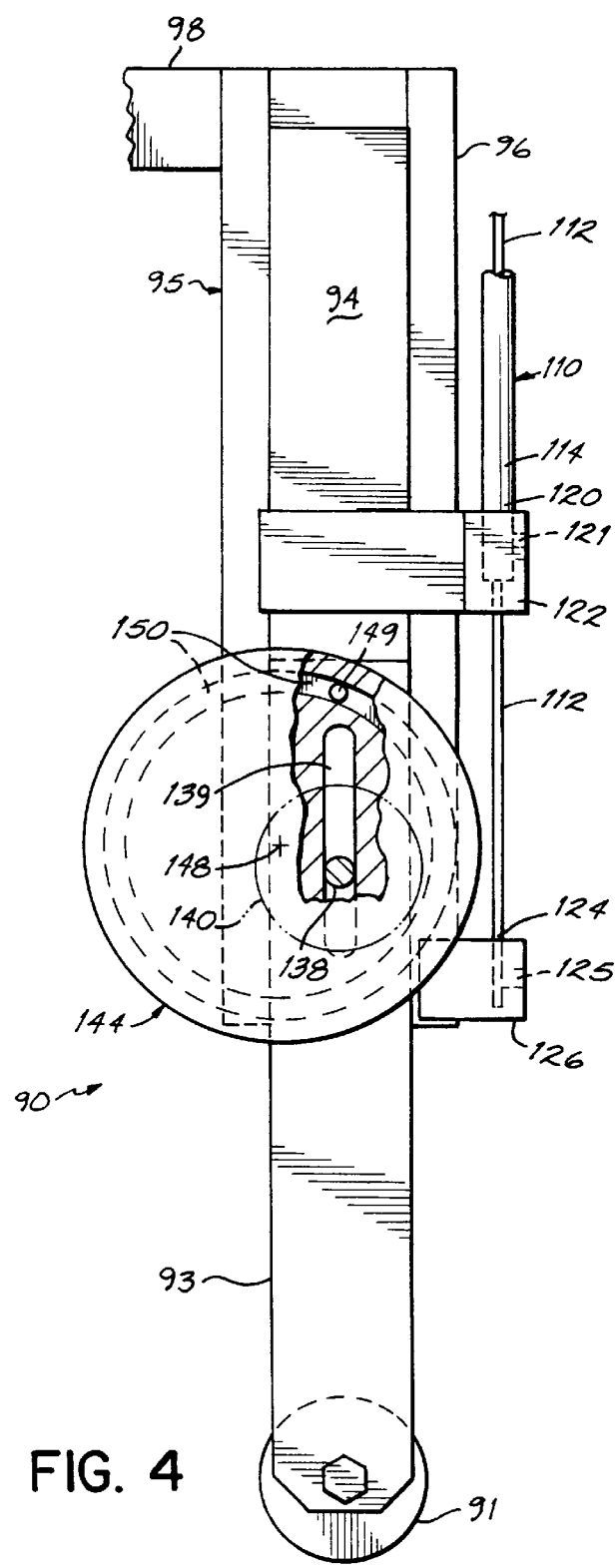
FIG. 3
FIG. 4

TOOL POSITION CONTROL

FIELD OF THE INVENTION

This invention relates to the field of engraving and, in particular, to an improved laser powered engraving machine.

BACKGROUND OF THE INVENTION

It is well known to use lasers to cut, score, or engrave surfaces of different materials. A laser produces a monochromatic beam of light in a known manner, and a focusing lens is used to reduce the diameter of the beam and adjust the depth of field of the focused beam. Before initiating a cutting operation, the laser power supply and feedrate of the laser head are adjusted in accordance with the material being cut. For example, to cut metals, the laser power is set higher than if softer materials such as wood are to be cut. In addition, the distance between the surface on the workpiece to be cut and the focusing lens is initially set. By setting that distance to the focal length, the smallest cutting beam is achieved for cutting along fine or thin lines. The distance between the laser head and the surface to be cut can be set to less than the focal length, thereby producing a larger cutting beam for cutting wider lines in the surface.

If the surface on the workpiece is a planar surface, once the desired distance between the surface and focusing lens is set, it does not change and therefore, does not have to be adjusted or corrected during the laser cutting process. In contrast, if the surface on the workpiece to be cut is curved, the distance between the laser head and the workpiece must be continuously adjusted as the laser head is moved over the curved surface. For example, as shown in U.S. Pat. No. 5,538,056, ultrasonic positioning sensors are associated with a laser head to maintain a desired distance between the laser head and the workpiece as the laser head moves over the cylindrical surface of the workpiece. In other applications, for example, as disclosed in U.S. Pat. No. 4,948,940, optical, inductive, or capacitive-type sensors are used to determine the distance between the laser head and the surface to be cut, thereby permitting the position of the laser head to be continuously adjusted as it moves over the curved surface. While such systems are effective, they require relatively expensive sensors and control devices. Thus, they add substantially to the cost of the laser engraving machine.

Therefore, there is a need to provide a laser cutting or engraving machine which has an improved device for controlling the position of the laser head with respect to the curved surface being cut.

SUMMARY OF THE INVENTION present invention provides a simple, inexpensive, mechanical tool position control for automatically and reliably maintaining a linearly moving tool a predetermined distance from a curved surface of a workpiece. The invention is especially useful in cutting graphics. The tool position control of the present invention has the further advantage of providing sufficient positioning accuracy and repeatability to provide an engraved graphical image having a very attractive visual appearance.

In accordance with the principles of the present invention and in accordance with the described embodiments, an apparatus includes a base located adjacent the workpiece; and a tool support is mounted with respect to the base and movable linearly in a first direction with respect to a curved surface of the workpiece. A tool is mounted on the tool support a desired distance from the curved surface and is movable linearly on the tool support in a second direction with respect to the curved surface. A tool position control mounted on the tool support includes a sensor disposed at a predetermined position with respect to the curved surface. The sensor moves in the second direction as a function of changes in the curvature of the curved surface in response to the tool support and the tool position control being moved in the first direction. The sensor is mechanically coupled to the tool so that as the sensor moves through a displacement in the second direction in response to the tool support moving the sensor in the first direction, the tool is moved through an approximately equal displacement in the second direction, thereby causing the tool to follow the motion of the sensor in the second direction and maintain the tool the desired distance from the curved surface of the workpiece.

In one aspect of the invention, the tool position control includes flexible linkage connected between the sensor and the tool. In another aspect of the invention, the tool position control includes a first wire-like element having one end fixed to one of the sensor and the tool and an opposite end fixed with respect to the tool support adjacent the other of the sensor and tool. A second wire-like element extends longitudinally adjacent the first wire element, and the first and second wire elements are independently longitudinally movable with respect to each other but move together in directions other than the longitudinal direction. The second wire-like element has one end fixed with respect to the other of the sensor and the tool and an opposite end fixed with respect to the tool support adjacent the one of the sensor and the tool.

In another aspect of the invention, the tool position control includes a cable having a hollow sheath with one end fixed with respect to the sensor and an opposite end fixed with respect to the tool support adjacent the tool. A wire extends longitudinally within the hollow sheath. The wire has one end fixed with respect to the tool and an opposite end fixed with respect to the tool support adjacent the sensor. Therefore, as the sensor moves the one end of the hollow sheath through a displacement in the second direction in response to the tool support moving the sensor over the curvature of the workpiece, the motion of the one end of the hollow sheath causes the opposite end of the wire to move the tool through an approximately equal displacement in the second direction, thereby causing the tool to follow the motion of the sensor in the second direction and maintain the tool the desired distance from the curved surface of the workpiece. Thus, the cable provides a simple, inexpensive, mechanical device for automatically and reliably controlling the position of the tool with respect to the curved surface of the workpiece.

These and other objects and advantages of the present invention will become more readily apparent during the following detailed description together with the drawings herein.

BRIEF DESCRIPTION OF THE DRAWINGS

FIG. 3 is a side elevation view of the tool support in accordance with the principles of the present invention.

FIG. 4 is a side elevation view of the tool guide in accordance with the principles of the present invention.

DETAILED DESCRIPTION OF THE INVENTION

Figure 1:
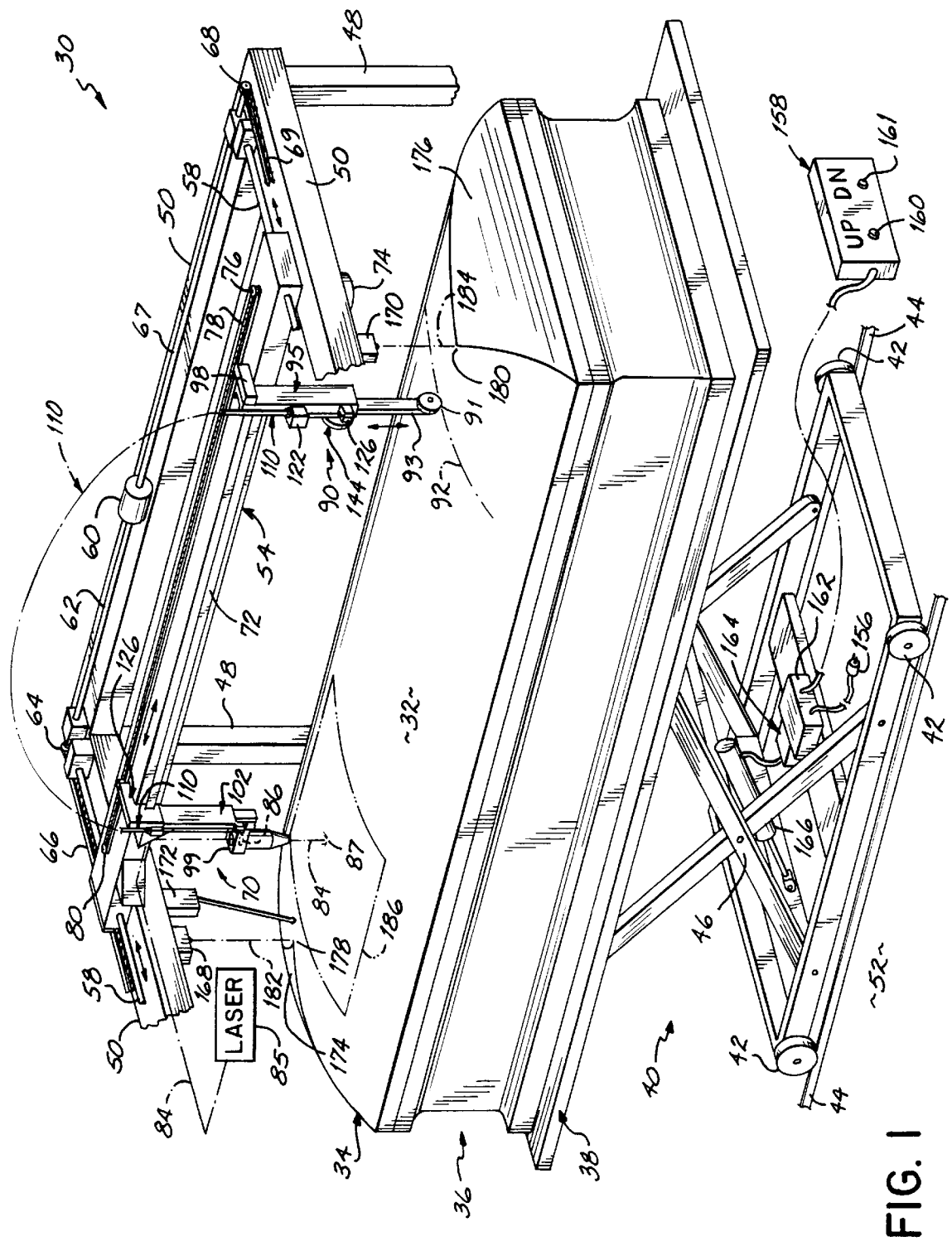
FIG. 1 is a schematic diagram of an engraving machine utilizing the tool position control constructed in accordance with the principles of the present invention.

A machine employing the tool position control of the present invention is illustrated in FIG. 1. A laser engraving machine 30 is designed to engrave the upper surface 32 of the lids, or tops, 34 of a casket 36. The casket 36 is supported on a work table 38 of a dolly 40 having wheels 42 riding on rails 44 for guiding the casket to the proper position with respect to the engraving machine 30. The dolly 40 includes a manually operable scissors jack 46 for moving the work table 38 and casket 36 to the desired elevation with respect to the machine 30. The engraving machine 30 includes four vertical posts, or columns, 48 at its corners (two of which are shown). The columns 48 are joined by horizontal structural members 50 to form a generally rectangular base or frame that is above the floor level 52.

A machine member or tool support, for example, a gantry, 54 is supported by the members 50 at the ends of the machine 30 and extends longitudinally the full length of the machine 30. The gantry 54 is mounted on circular ways 58, for example, linear ball bushings, so that the gantry is movable linearly across the width of the machine 30 which direction is hereinafter referred to as the X-axis of motion. A drive motor 60, for example, a stepping motor, is mounted to one of the frame structures 50. A drive shaft 62 extending from one end of the motor 60 is connected to a drive gear, or pulley, 64. A continuous drive belt, or chain, 66 is looped around the drive pulley 64 and is also looped around an idler pulley (not shown) located at an adjacent corner on the other side of the machine. The drive belt 66 is attached to one end of the gantry 54. A second drive shaft 67 extends from an opposite end of the motor 60 and is coupled to a second drive pulley 68, drive belt 69, and idler pulley (not shown). The drive belt 69 is operably connected to the opposite end of the gantry 54, and therefore, energization of the motor 60 is effective to move the gantry 54 back and forth along the X-axis of motion.

Figures 2, 5:
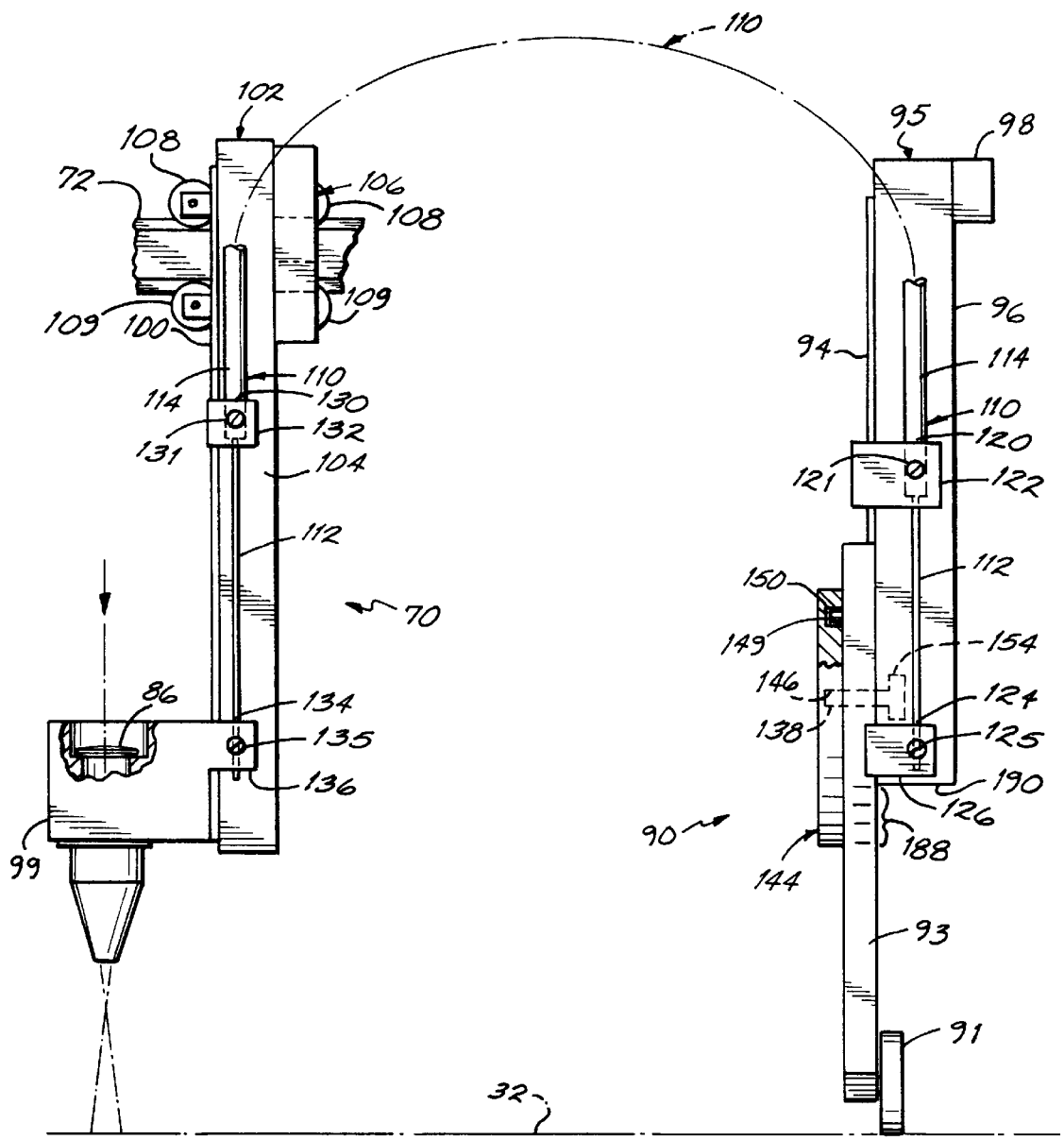
FIG. 2 is a front elevation view of the tool support and the tool guide in accordance with the principles of the present invention.
FIG. 5 is a schematic block diagram of the control commanding motion of the tool support of the engraving machining.

A tool holder 70 is mounted on a way, for example, a V-shaped way, 72 extending longitudinally on the gantry 54, and the tool holder 70 is movable linearly along the length of the gantry 54 in a direction hereafter referred to as the Y-axis of motion. A drive motor 74 mounted to the gantry 54 and is connected to a drive pulley 76. A gear belt, or chain, 78 is looped around the drive pulley 76 and an idler pulley 80 also mounted to the gantry 54. The drive belt 78 is also connected to the tool holder 70 and, therefore, energization of the motor 74 is effective to move the tool holder 70 back and forth along the gantry 54 in the Y-axis of motion. Thus, the gantry 54 and tool holder 70 are movable in a plane defined by the X and Y axes of motion over the surface 32 of the casket lid 34. Referring to FIG. 5, the motors 60, 74 are controlled by motor controllers 81, 82, respectively, which receive command signals from a computer numerical control ("CNC") 83 in a known manner.

As is known, a laser beam 84 is provided by a laser 85 and directed by a series of mirrors (not shown) into a focusing lens 86. The focusing lens 86 provides a conical beam of light that converges to a focal point at a distance in front of the lens 86 defined by the focal length of the lens. The laser beam 84 contacts the surface 32 over a circular area 87. If the lens 86 is positioned to align the focal point with the surface 32, the area 87 is small; and the power density of the beam 84 is greatest, thereby providing maximum cutting power. If the lens 86 is moved toward or away from the surface 32, the area 87 is larger and the power density is less, thereby providing less cutting power. For consistent results, it is required that the lens 86 be maintained a predetermined distance from the surface 32 while the laser cutting or engraving process is being executed. That distance is measured in the generally vertical direction, hereinafter referred to as the Z-axis of motion. Given the curved nature of the surface 32, as the lens 86 is moved linearly to different positions in the X-axis, the distance between the lens 86 and the surface 32 changes constantly.

To control the vertical position or elevation of the lens 86 in the Z-axis with respect to the surface 32, a tool guide or position control 90 is employed. The tool position control 90 utilizes a probe or sensor 91 disposed in a predetermined position with respect to the surface 32 to sense the curvature or profile 92 of the surface 32, for example, a guide wheel in rolling contact with the surface 32. As the gantry 54 is moved along the X-axis, the wheel 91 senses by rolling along or tracing the curvature 92 of the curved surface 32. Referring to FIGS. 2 and 4, the wheel 91 is rotatably mounted to an adjustment bar 93, and the adjustment bar 93 is slidably mounted to a movable slide 94 of a linear bearing 95. The bearing slide 94 moves linearly in the vertical direction with respect to a bearing base 96. The bearing base 96 is mounted vertically onto a bracket 98 which, in turn, is rigidly connected to the gantry 54.

Similarly, referring to FIGS. 2–4, a tool, for example, the lens 86 and its support 99, are mounted to a bearing slide 100 of a linear bearing 102. The slide 100 moves linearly in a bearing base 104 of the linear bearing 102, and the bearing base 104 is mounted vertically on a bracket 106. The bracket 106 has an arm 107 that extends over the gantry 54 and is attached to the drive belt 78. Upper and lower pairs of V-cut tracking wheels 108, 109, respectively, are rotatably mounted to the bracket 106 such the V-cuts in the periphery of the wheels 108, 109 ride on the V-shaped profiles on the upper and lower edges of the V-shaped way 72. The linear bearing 102 and bracket 106 comprise the tool holder 70. Thus, the lens 86 is free to move up and down in the vertical Z-axis of motion. A cable 110 is connected between the linear bearing 95 for the guide wheel 91 and the linear bearing 102 for the lens 86. The cable 110 includes a flexible wire 112 that is inserted into a flexible hollow sheath 114. The cable 110 may be a throttle control cable, for example, part No. 1382-R100 commercially available from Northern Hydraulics of St. Paul, Minnesota. Normally, the cable has a length equal to 1.5 times the length of travel along the Y-axis of motion, so that the cable extends in a continuous arc and always exceeds its specified minimum bend radius.

Referring to FIGS. 2 and 4, the end 120 of the sheath 114 is attached, via one or more screws 121, to a clamp 122 that, in turn, is fixed to the bearing slide 94. While the clamp 122 secures the end 120 of the sheath 114, the wire 112 is free to move longitudinally with respect to the clamp 122 and the sheath 114. One end 124 of the wire 112 is rigidly attached, via one or more set screws 125, to a clamp 126 that, in turn, is connected to the bearing base 96. Thus, the end 124 of the wire 112 is fixed in a vertical position with respect to the gantry 54. However, in contrast, the end 120 of the sheath 114 moves in the vertical Z-axis of motion as the wheel 91 moves up and down as it traces over the curved profile 92 of the surface 32.

Referring to FIGS. 2 and 3, the other end 130 of the cable sheath 114 is rigidly attached, by one or more set screws 131, to a clamp 132 that is attached to the stationary base 104 of the bearing 102. The other end 134 of the wire 112 is free to move with respect to the end 130 of the sheath 1 14. The end 134 of the wire 112 is rigidly attached, via one or more set screws 135, to a clamp 136 that is part of the lens support 99 connected to the movable slide 100 of the linear bearing 102.

While normally the length of the cable 110 is approximately 1.5 times the length of travel of the Y-axis of motion. The optimum length of the cable is often empirically determined. Further, the cable supplier's specification for recommended minimum bend radius must also be considered. Normally, during installation, the slides 94, 100 of the respective linear bearings 95, 102 are permitted to drop to their lowermost positions. After both ends of the wire 112 and sheath 114 are connected, the set screw 125 locking the end 124 of the wire 112 in the clamp 126 is loosened, the end 124 of the wire 112 is pulled until the bearing slide 100 begins to lift. The wire is released just enough to lower the bearing slide 100 to its lowermost position, and the set screw 125 of the clamp 126 is tightened on the end 124 of the wire 112.

As the wheel 91 traces upward toward the center of the profile 92, the wheel 91 moves in a vertically upward direction that causes the movable bearing slide 94, clamp 122 and end 120 of the cable sheath 114 to move vertically upward through a common displacement. Since the wire 112 extends through the cable sheath 114, as the end 120 of the cable sheath 122 moves vertically upward, the entire cable, including the wire 112 will experience an upward motion. However, the end 124 of the wire 112 is fixed in elevation and cannot move. In contrast, the end 134 of the wire 112 is free to move and experiences an upward directed force that pulls the slide 100, clamp 136, and lens support 99 up through a displacement approximately equal to the upward vertical displacement of the wheel 91. Similarly, as the wheel moves vertically downward over the profile 92, the end 120 of the sheath 114 moves vertically downward. The upwardly directed force is removed from the end 134 of the wire 112, and gravity pulls the lens support 99, slide 100, and clamp 136 in a vertically downward direction. Consequently, as the guide wheel 91 moves vertically up and down, the lens 86 follows that upward and downward motion.

In the application illustrated in FIG. 1, the engraving may occur on materials of substantially different oxidation temperatures, that is, temperatures at which they burn and vaporize. For example, the casket lid 34 may be made from a hard wood, a soft wood, hard metal, or a soft metal. Alternatively, the engraving may be on a plaque applied to the casket lid. As is well known, some engraving may require a fine or thin line be cut, and therefore, the lens 86 should be positioned so that the area 87 is small. In other areas of the engraving, it may be desirable to cut a wider line, either to achieve a different texture or effect, or to accommodate a different surface curvature. Thus, the lens 86 may be moved away from or closer to the surface 32 to cause the surface 32 to intersect the conically shaped laser beam over a wider area 87. The power setting on the laser and the feedrate of the lens 86 along the rail 54 are adjusted in accordance with the material being cut, for example, wood or metal.

Consequently, it is desirable that the position of the lens 86 be vertically adjustable with respect to the surface 32 of the casket 36. To provide that adjustability, in one embodiment illustrated in FIG. 4, a fastener 138 extends through a hole (not shown) and through a slot 139 in the adjustment bar 93. The slot 139 has a length approximately equal to the desired range of adjustment of the lens 86. A finger nut 140 (shown in phantom) is threaded over the end of the fastener 138. Thus, by loosening the finger nut 140, the adjustment bar 93 may be slid longitudinally with respect to the bearing slide 94. While maintaining the guide wheel in contact with the casket, moving the bearing slide 94 vertically upward with respect to the stationary adjustment bar 93 lengthens the guide wheel support arm. Further, upward motion of the bearing slide 94 results in a corresponding upward motion of the bearing slide 100, the lens support 99 and lens 87. Thus, the initial position of the lens support 99 with respect to the surface 32 is adjusted by manipulating the position of the adjustment bar 93 with respect to the bearing slide 94.

Referring to FIGS. 2 and 4, an alternative adjustment mechanism utilizes an eccentric adjustment wheel 144 having a mounting hole 146, which is offset from the geometric center line 148 of the adjustment wheel 144. Thus, the adjustment wheel rotates eccentrically with respect to the pivot hole 146. A guide pin 149 is mounted in the adjustment bar 93 and is disposed in a slot 150 extending annularly around the perimeter of the adjustment wheel 144. The fastener 138 extends through the movable slide 94, through the slot 139 in the adjustment bar 93 and through the pivot hole 146 of the adjustment wheel 144. A nut 154 on the end of screw 138 secures and secures the assembly together. The nut 154 is tightened to provide a force holding the components in position so that they do not move in response to the normal operation of the guide wheel 91, but not locking the components together.

The adjustment wheel 144 is made from a low friction material, for example, a "DELRIN" acetal polymer, so that it slides readily with respect to the aluminum adjustment bar 93 and stainless steel pin 150. Thus, the initial offset of the lens 86 may be adjusted by simply rotating the adjustment wheel 144. Rotation of the adjustment wheel clockwise from the position illustrated causes the pin 148 and the adjustment bar 93 to move in the vertically upward direction with respect to the bearing slide 94 and vice versa. The desired position of the lens 86 as may be determined by aligning the perimeter of wheel 144 with a scale of graduations etched or scored on the adjustment bar 93.

The desired distance of the lens 86 from the surface 32 of the casket is empirically determined by engraving different casket materials with the lens 86 set at different positions until the desired position is determined. Thus, for any given casket, the desired position of the lens 86 with respect to the casket surface 32 is known, and those desired positions may be recorded by marks or lines 188 (FIG. 2) scored or marked on the adjustment bar 93.

In use, prior to loading a casket into the machine, and with the bearing slide 94 fully extended in the vertically downward direction, the position of the lens 86 is set by adjusting the position of the alignment bar 93 and relative to the movable bearing slide 94. Referring to FIG. 2, utilizing the finger nut 140 or the adjustment wheel 144, the position of the adjustment bar 93 may be set by aligning one of the graduation marks 188 representing the selected casket material with a lower surface 190 of the stationary bearing base 96.

Referring to FIG. 5, the operator then utilizes the CNC 83 in a manual or alignment mode to move the tool holder 70 and gantry 54 to the home position at which the tool holder 70 and tool guide 90 will not contact the casket during casket loading and alignment. The home position is normally defined by limit switches positioned in a known manner. In response to a home position command, the CNC 83 provides motion command signals to X and Y axes motor controllers 81, 82, respectively, which, in turn, operate the X and Y motors 60, 74, respectively, that, in turn, move the gantry 54 and tool holder 70 until they actuate home position limit or other proximity switches. The laser power is set according to the material in the casket being cut.

A casket 36 is then loaded on to the work table 38 of the dolly 40. Preferably, the casket is centered on the support table 38 by visual inspection. The dolly 40 is then rolled on the rails 44 into the engraving machine 30. Referring to FIG. 1, the dolly 40 is connected to a power source via a power cord 156. Power is supplied to a logic control 162, which, in turn, provides power to a motor and pump unit 164. The motor and pump unit 164 provides fluid to a cylinder 166 that causes the scissors jack 46 to raise or lower the support table 38. A hand held pendant 158 having up and down pushbuttons 160, 161, respectively, is also connected to the logic control 162.

Two LEDs 168, 170 and a limit switch 172 connected to the support structure 50 of the machine 30 are used to align the casket with respect to the engraving machine 30. The casket 36 has pie sections 174, 176 at each end. The pie sections 174, 176 intersect the surface 32 at points 178, 180, which define the uppermost height of the casket; and a line connecting the points 178, 170 bisects the crown of the surface 32. The LEDs 168, 170 are positioned on the support structure 50 such that a line connecting their respective beams 182, 184 bisects the field 186 within which the engraving on the surface 32 is to be performed. Further, the limit switch 172 is positioned approximately on a line intersecting the beams 182, 184.

The casket 36 and dolly 40 are rolled on the rails 44 into the engraving machine 30 until the projections of the LED beams 182,184 on the surface 32 are reasonably close to the points 178, 180, respectively. At that point, the up pushbutton 160 is depressed, which causes the scissors jack 46 to raise the support table 38 and casket 36 in the vertically upward direction. When the top of the casket is close to contacting the limit switch 172, the up pushbutton 160 is released, thereby stopping motion and maintaining the support table 38 and casket 36 in an elevated position. The casket 36 is then manually manipulated until the projections of the beams 182, 184 on the surface 32 align as closely as possible with the points 178, 180, respectively. The up pushbutton 160 is again depressed, and the casket 36 and support table 38 are raised further by the scissors jack 46 until the surface 32 contacts the limit switch 172. The limit switch is connected to the logic control 166, and activation of the limit switch 172 causes the logic control 166 to disconnect power from the pump unit 164. With the casket 36 is at the proper elevation, the dolly 40 is then pushed further into the machine 30 to a desired position therewith. The exact position will depend on the size of the casket 36 and the size of the field 186.

Referring to FIG. 5, the pattern to be engraved has previously been prepared using the graphics capability of a desk top publishing program, for example, "COREL DRAW", commercially available from Corel Corporation of Ottawa, Ontario, Canada, which program is being run in a personal computer 192. The program provides Cartesian coordinate data representing the graphic image in HPGL format, which is transmitted over a communication link 194 to the CNC 83. The CNC 83 then transforms the HPGL commands into X and Y coordinate commands, which are suitable for input to the motor controllers 81, 82. While the tool position control 90 may not be suitable for applications requiring the highest degree of tool positioning accuracy and repeatability, the control provides sufficient accuracy and repeatability for cutting graphical images and provides a very attractive finish to the image.

When the engraving program is complete, the laser 85 is turned OFF, and the tool holder 70 and gantry 54 are returned to their home positions. A down pushbutton 161 is depressed to lower the casket 36 and table support 38 to a position suitable for removing the dolly from the engraving machine 30. The downward motion of the support table 38 is stopped by releasing the down pushbutton 161.

While the invention has been set forth by a description of the preferred embodiment in considerable detail, it is not intended to restrict or in any way limit the claims to such detail. Additional advantages and modifications will readily appear to those who are skilled in the art. For example, the cable comprising the wire 112 and sheath 114 may be replaced by first and second wire-like elements that are independently, longitudinally movable with respect to each other, but move together in directions other than the longitudinal directions.

As described herein, the wheel 91 is used to sense the curvature of the surface 32; however, as will be appreciated other contacting sensing devices, for example, a contacting probe, may be used. In addition, other noncontacting sensing devices that are capable of providing relative motion between the sheath 114 and the wire 110 may be used.

In the described embodiment, the tool positioning device is applied to an engraving machine for cutting the curved surface 32 of a casket lid 34. As will be appreciated, the tool positioning device 90 may be applied to a wide variety of workpieces in which the tool moves linearly with respect to a curved surface on the workpiece.

The described embodiment utilizes a laser cutting operation. However, as will be appreciated, the tool positioning device of the present invention is not limited to laser cutting and may be applied to other operations on a workpiece, for example, cleaning, inspection, and other cutting or scribing operations. Further, even though a laser is described in the above embodiment, the present invention may be used with infrared devices, sonic devices, line markers, ascribe a small chip-making cutting tool, etc.

In the described embodiment, the end 120 of the sheath 114 is connected to the bearing slide, whereas the end 124 of the wire 112 is connected to the stationary bearing support 96. Further, the other end 130 of the sheath 114 is fixed to the stationary bearing base 104 and the other end is 134 of the wire 112 is connected to the bearing slide 100. As will be appreciated, the stationary and movable connections may be reversed such that the one end 120 of the sheath 114 is connected to the stationary bearing base and the one end 124 of the wire 112 is connected to the movable bearing slide 94. In that situation, the other end 130 of the sheath 114 would be connected to the movable bearing slide 100, and the other end 134 of the wire 112 would be connected to the stationary bearing base 104. The connections as recited in the illustrated and described embodiment are preferred where the tool and bearing slide 100 have sufficient weight to utilize gravity to pull the slack out of the cable wire as the guide wheel moves up and down. For lighter tools, as will be appreciated, a return spring may be employed.

As will be further appreciated, other mechanisms and methods may be used for initially aligning and positioning the workpiece 36 with respect to the machine 30. As described herein, the auto focus adjustment only follows a change in curvature in one direction, that is, in the direction of motion of the rail 54. As will be appreciated, the invention can be modified to follow a bowl shaped or hemispherical curvature in two directions, that is, along two axes of motion. In that embodiment, the tool position control 90 would be mounted on the V-shaped way 72 using a bracket similar to the bracket 106. The bearing bases 100 and 96 would be connected together, for example, by connecting the bearing base 96 to the drive belt 78 as is done with bearing base 100 using bracket 106. Alternatively, the bearing base 96 would not be connected to the drive belt 78 but would be connected directly to the bearing base 100 using a rod or shaft. In this embodiment, the rotating wheel sensor 91 would be replaced by a tracing probe having a hemispherical tip. Therefore, as the lens 86 is moved along the circular way 58 and the V-shaped way 72, the sensor 91 will be moved in accordance with the changes in curvature in those two directions; and as previously described herein, the tool position control 90 will function to automatically adjust the height of the lens 86 and maintain the lens a fixed distance from the surface.

The invention, therefore, in its broadest aspects, is not limited to the specific details shown and described. Consequently, departures may be made from the details described herein without departing from the spirit and scope of the claims which follow:

What is claimed is:

1. An apparatus for maintaining a tool a predetermined distance from a curved surface of a workpiece, the apparatus comprising:
    a base located adjacent the workpiece;
    a tool support mounted with respect to the base and movable linearly in a first direction with respect to the curved surface;
    a sensor mounted on the tool support and movable in a second direction with respect to the curved surface of the workpiece, the sensor being disposed at a predetermined position with respect to the curved surface and moving in the second direction as a function of changes in the curvature of the curved surface in response to the tool support and the sensor being moved in the first direction;
    a tool mounted on the tool support a desired distance from the curved surface and movable linearly in the second direction; and
    a cable including
        a hollow sheath having one end fixed with respect to the sensor and an opposite end fixed with respect to the tool support adjacent the tool, and
        wire extending longitudinally within the hollow sheath, the wire having one end fixed with respect to the tool and an opposite end fixed with respect to the tool support adjacent the sensor, so that as the sensor moves the one end of the hollow sheath through a displacement in the second direction in response to the tool support moving the sensor in the first direction with respect to the curved surface, the motion of the one end of the hollow sheath causes the opposite end of the wire to move the tool through an approximately equal displacement in the second direction, thereby causing the tool to follow the motion of the sensor in the second direction and maintain the tool in the desired distance from the curved surface of the workpiece.

2. The apparatus of claim 1 further comprising a first linear bearing having a base and a sliding member linearly movable relative to each other, the base being mounted with respect to the tool support and the sensor being mounted with respect to the sliding member.

3. The apparatus of claim 2 further comprising a second linear bearing having base and a sliding member linearly movable relative to each other, the base of the second linear bearing being mounted with respect to the tool support and the tool being mounted with respect to the sliding member of the second linear bearing.

4. The apparatus of claim 3 wherein the one end of the hollow cable is connected with respect to the sliding member of the first linear bearing and the opposite end of the hollow cable is connected with respect to the base of the second linear bearing.

5. The apparatus of claim 4 wherein the one end of the wire is connected with respect to the base of the first linear bearing and the opposite end of the wire is connected with respect to the sliding member of the second linear bearing.

6. The apparatus of claim 1 wherein the motion of the sensor and the tool in the second direction is generally perpendicular to motion of the tool support in the first direction.

7. The apparatus of claim 1 wherein motion of the tool support with respect to the base in the first direction is generally horizontal and motion of the sensor and the tool in the second direction is generally vertical.

8. The apparatus of claim 1 wherein the sensor is in contact with the curved surface of the workpiece.

9. The apparatus of claim 8 wherein the sensor includes a rotating element for rolling along the curvature of the curved surface in the first direction.

10. The apparatus of claim 1 further comprising means for adjusting the desired distance of the tool from the curved surface.

11. The apparatus of claim 1 wherein the sensor is adjustably mounted with respect to the tool support to be movable to different positions in the second direction.

12. The apparatus of claim 11 wherein the sensor is adjustably mounted to the sliding member of the first linear bearing.

13. The apparatus of claim 12 wherein the sensor is mounted to one end of an adjusting member, the adjusting member is slidably mounted with respect to the sliding member of the first linear bearing.

14. The apparatus of claim 13 further comprising a locking device mounted with respect to the adjusting member and the sliding member of the first linear bearing for locking the adjusting member in different positions with respect to the sliding member of the first linear bearing.

15. The apparatus of claim 1 wherein the hollow sheath and the wire have fixed lengths and the apparatus further comprises an adjustable connector for connecting an end of the one of the hollow sheath and the wire at different points, thereby changing an effective length of the one of the hollow sheath and the wire.

16. An apparatus for maintaining a linearly moving tool a predetermined distance from a curved surface of a workpiece, the apparatus comprising:
    a base located adjacent the workpiece;
    a tool support mounted with respect to the base and movable linearly in a first direction with respect to the curved surface;
    a tool mounted on the tool support at a desired position relative to the curved surface and movable linearly in a second direction with respect to the curved surface of the workpiece and the tool support; and
    a tool position control mounted on the tool support and having a sensor disposed in a predetermined position with respect to the curved surface, the sensor moving in the second direction as a function of changes in the curvature of the curved surface in response to the tool support and the tool position control being moved in the first direction, the sensor being mechanically coupled to the tool independent of the tool support so that as the sensor moves through a displacement in the second direction in response to the sensor moving in the first direction with respect to the curved surface, the tool moves through an approximately equal displacement in the second direction, thereby causing the tool to follow the motion of the sensor in the second direction and maintain the tool in the desired position relative to the curved surface of the workpiece.

17. The apparatus of claim 16 wherein in the sensor is mechanically coupled to the tool using a flexible linkage.

18. The apparatus of claim 17 wherein in the flexible linkage comprises:

a first wire-like element having one end fixed to one of the sensor and the tool and an opposite end fixed with respect to the tool support adjacent the other of the sensor and tool; and a second wire-like element extending longitudinally adjacent the first wire element, the first and second wire elements being independently longitudinally movable with respect to each other but moving together in directions other than the longitudinal direction, the second wire-like element having one end fixed with respect to the other of the sensor and the tool and an opposite end fixed with respect to the tool support adjacent the one of the sensor and the tool.

19. The apparatus of claim 16 wherein in the tool position control is nonmovably mounted on the tool support at a fixed location.

20. An apparatus for maintaining a linearly moving tool a predetermined distance from a curved surface of a workpiece, the apparatus comprising:

a base located adjacent the workpiece;

a tool support mounted with respect to the base and movable linearly in a first direction with respect to the curved surface;

a tool mounted on the tool support at a desired position relative to the curved surface and movable linearly in second and third mutually perpendicular directions with respect to the curved surface of the workpiece and the tool support; and a tool position control mounted at a fixed location on the tool support and having a sensor disposed in a predetermined position with respect to the curved surface, the sensor moving in the second direction as a function of changes in the curvature of the curved surface in response to the tool support and the tool position control being moved in the first direction, the sensor being mechanically coupled to the tool so that as the sensor moves through a displacement in the second direction in response to the sensor moving in the first direction with respect to the curved surface, the tool moves through an approximately equal displacement in the second direction, thereby causing the tool to follow the motion of the sensor in the second direction and maintain the tool in the desired position relative to the curved surface of the workpiece.

* * * * *